United States Patent
Shirakami et al.

(10) Patent No.: US 10,717,002 B2
(45) Date of Patent: Jul. 21, 2020

(54) GAME DEVICE, METHOD FOR CONTROLLING GAME DEVICE

(71) Applicant: SQUARE ENIX CO., LTD., Tokyo (JP)

(72) Inventors: Yoji Shirakami, Tokyo (JP); Prasert Prasertvithyakarn, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 35 days.

(21) Appl. No.: 15/819,442

(22) Filed: Nov. 21, 2017

(65) Prior Publication Data

US 2018/0147489 A1 May 31, 2018

(30) Foreign Application Priority Data

Nov. 28, 2016 (JP) .................................. 2016-230542

(51) Int. Cl.
- *A63F 13/42* (2014.01)
- *A63F 13/422* (2014.01)
- *A63F 13/58* (2014.01)

(52) U.S. Cl.
CPC ............ *A63F 13/42* (2014.09); *A63F 13/422* (2014.09); *A63F 13/58* (2014.09); *A63F 2300/64* (2013.01)

(58) Field of Classification Search
CPC .......... A63F 13/10; A63F 13/42; A63F 13/56; A63F 13/57; A63F 13/06
See application file for complete search history.

(56) References Cited

U.S. PATENT DOCUMENTS

| 8,231,468 B2 | 7/2012 | Kouno |
| 2004/0038739 A1* | 2/2004 | Wanat .................... A63F 13/10 463/36 |
| 2015/0072745 A1* | 3/2015 | Sogabe ................ A63F 13/812 463/3 |

(Continued)

FOREIGN PATENT DOCUMENTS

JP 2007-075467 3/2007

OTHER PUBLICATIONS

Yoji Shirakam and Prasert Prasertvithyakarn, "Level Meta AI Control System for Final Fantasy XV", Computer Entertainment Developers Conference 2016 (CEDEC 2016), (http://cedec.cesa.or.jp/2016/), Aug. 24 to 26, 2016, Tatsuhiro Joudan et al. of Square Enix Co., Ltd., Pacifico Yokohama, Yokohama-shi, Japan.

(Continued)

*Primary Examiner* — William H McCulloch, Jr.
*Assistant Examiner* — Ankit B Doshi
(74) *Attorney, Agent, or Firm* — Greenblum & Bernstein, P.L.C.

(57) ABSTRACT

In a state in which operation input for causing a first game character to move is being inputted by a user, the first game character is caused to move in response to the operation input, and the first game character is caused, during the movement, to perform an action that artificial intelligence decided as an action that the first game character is to perform in relation to a second game character. In a state in which the operation input is not being inputted by a user, the first game character is caused to perform an action that artificial intelligence decided as an action that the first game character is to perform in relation to the second game character.

10 Claims, 3 Drawing Sheets

(56) References Cited

U.S. PATENT DOCUMENTS

2017/0304728 A1* 10/2017 Fujisawa ................ A63F 13/25

OTHER PUBLICATIONS

Yoji Shirakam and Prasert Prasertvithyakarn, http://cedil.cesa.or.jp/cedil_sessions/view/1544, Jun. 20, 2016, Square Enix Co., Ltd.
Yoji Shirakam and Prasert Prasertvithyakarn, https://store.playstation.com/#!/ja-jp/%e3%82%b2%e3%83%bc%e3%83%a0/final-fantasy-xv-judgment-disc/cid=JP0082-CUSA07048_00-FINALFANTASYXVTR, Nov. 11, 2016, Square Enix Co., Ltd.
Yoji Shirakam and Prasert Prasertvithyakarn, https://www.microsoft.com/ja-jp/store/p/final-fantasy-xv-judgment-disc/c0gdwzp4319t, Nov. 11, 2016, Square Enix Co., Ltd.

* cited by examiner

GAME DEVICE, METHOD FOR CONTROLLING GAME DEVICE

This application claims the benefit of Japanese Patent Application No. 2016-230542, filed Nov. 28, 2016, which is hereby incorporated by reference herein in its entirety.

BACKGROUND OF THE INVENTION

Field of the Invention

The present invention relates to a technique for controlling an action of a character that appears in a game.

Description of the Related Art

A character appearing in a game (hereinafter referred to as a game character) may be a game character operated by a player or a game character operated by a game device without being operated by a player. Also, an artificial intelligence technique is used to control actions of a game character that is not operated by a player but operated by a game device.

SUMMARY OF THE INVENTION

An applicant of the present invention provides a technique for controlling actions of a game character by combining operation input from a player and an artificial intelligence technique.

According to one aspect of the present invention, there is provided a game device comprising: a first control unit configured to, in a state in which operation input for causing a first game character to move is being inputted by a user, cause the first game character to move in response to the operation input, and cause the first game character, during the movement, to perform an action that artificial intelligence decided as an action that the first game character is to perform in relation to a second game character; and a second control unit configured to, in a state in which the operation input is not being inputted by a user, cause the first game character to perform an action that artificial intelligence decided as an action that the first game character is to perform in relation to the second game character.

According to another aspect of the present invention, there is provided a method for controlling a game device, the method comprising: in a state in which operation input for causing a first game character to move is being inputted by a user, causing the first game character to move in response to the operation input, and causing the first game character, during the movement, to perform an action that artificial intelligence decided as an action that the first game character is to perform in relation to a second game character; and in a state in which the operation input is not being inputted by a user, causing the first game character to perform an action that artificial intelligence decided as an action that the first game character is to perform in relation to the second game character.

Further features of the present invention will become apparent from the following description of exemplary embodiments (with reference to the attached drawings).

DESCRIPTION OF THE EMBODIMENTS

Hereinafter, explanation will be given regarding an embodiment of the present invention with reference to the attached drawings.

First Embodiment

Figure 1:
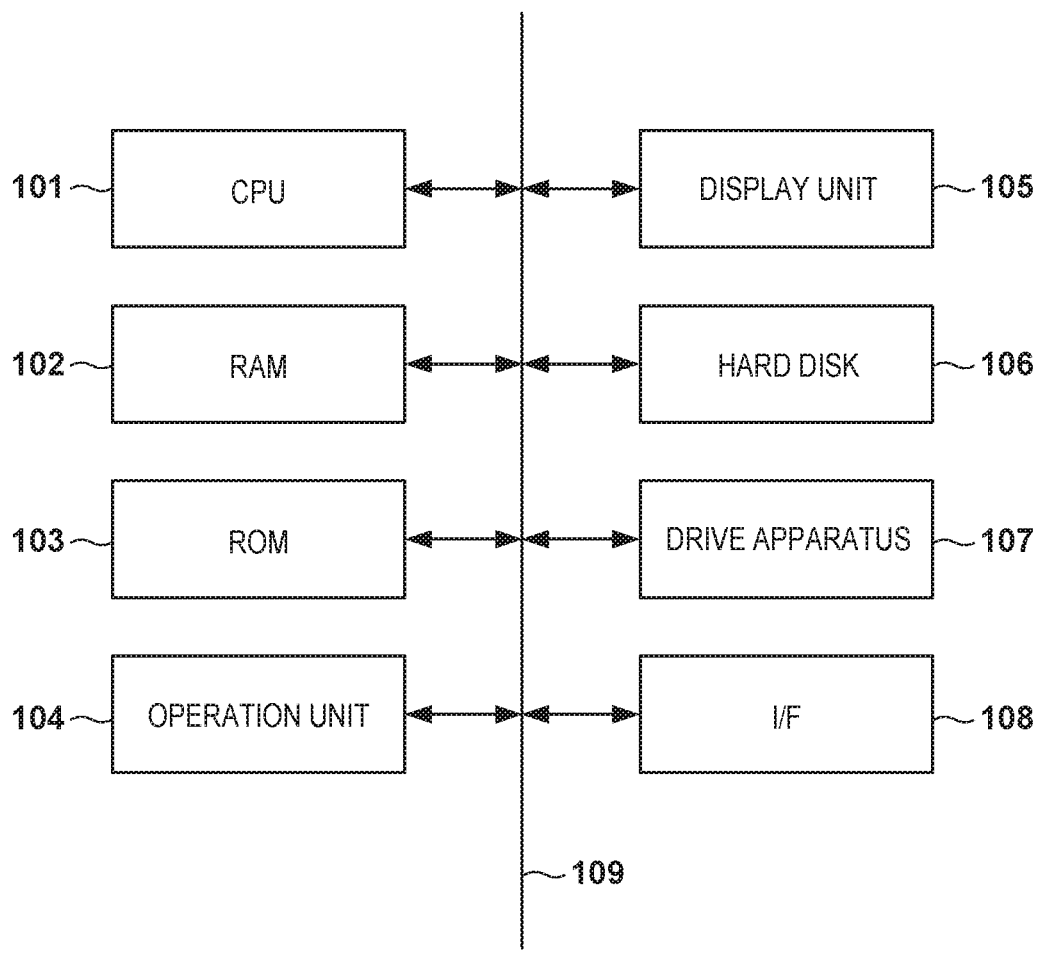
FIG. 1 is a block diagram illustrating an example of a hardware configuration of a game device.

First, explanation will be given using a block diagram of FIG. 1 for an example of a hardware configuration of a game device according to the present embodiment. Note that the configuration which is illustrated in FIG. 1 is merely an example of a configuration in which each process described below can be realized, and any configuration may be used if it can realize each process described below.

A CPU 101 executes various processes by using data and computer programs stored in a RAM 102 or a ROM 103. By this, the CPU 101 performs operation control of a game device overall, and also executes or controls each process described later as something that the game device performs.

The RAM 102 has an area for storing computer programs and data loaded from a hard disk 106, and computer programs and data read from storage media such as a CD-ROM or a DVD-ROM by a drive apparatus 107. Furthermore, the RAM 102 has an area for storing data or computer programs received from an external unit via an I/F (interface) 108. In this way, the RAM 102 can provide various areas as necessary.

The ROM 103 stores, for example, setting data and a boot program of the game device which need not be rewritten.

An operation unit 104 is configured by a user interface for games such as a game pad, a joystick, or the like or a user interface that can be used for an intended use other than a game such as a keyboard, a mouse or the like, and a user can operate it to input various instructions in relation to the CPU 101.

A display unit 105 is configured by a CRT, a liquid crystal screen, or the like, and can display results of processing by the CPU 101 using images, text, or the like. Note that a touch panel screen may be configured by combining the operation unit 104 and the display unit 105.

An OS (operating system), a computer program and data for a game are stored in the hard disk 106. Also, what is described below as known information is stored in the hard disk 106. A computer program and data saved in the hard disk 106 is appropriately loaded to the RAM 102 in accordance with control by the CPU 101, and becomes a target of processing by the CPU 101.

The drive apparatus 107 reads data or computer programs stored in storage media such as a CD-ROM or a DVD-ROM and outputs them to the hard disk 106 or the RAM 102. The drive apparatus 107 reads data or a computer program from storage media in which data or a computer program for a game is stored and outputs them to the hard disk 106 or the RAM 102, for example.

An I/F 108 functions as an interface for performing data communication with an external unit.

All of the CPU 101, the RAM 102, the ROM 103, the operation unit 104, the display unit 105, the hard disk 106, and the drive apparatus 107, and the I/F 108 are connected to a bus 109.

In the present embodiment, when one or more game characters (game characters that are not the target of operation by a player, and game characters whose actions and state are decided by the CPU 101; referred to as non-operation target game characters below) are positioned in the surroundings of a game character that a player operates (referred to as an operation target game character below), and the operation target game character moves, the non-operation target game characters also move as appropriate together with the action of the operation target game character, and when the operation target game character stops, the non-operation target game characters stop in the surroundings of the operation target game character. Processing to track the movement and stopping of an operation target game character and control the movement of one or more other game characters in this way is known, and so a corresponding detailed description will be omitted.

Figure 4:
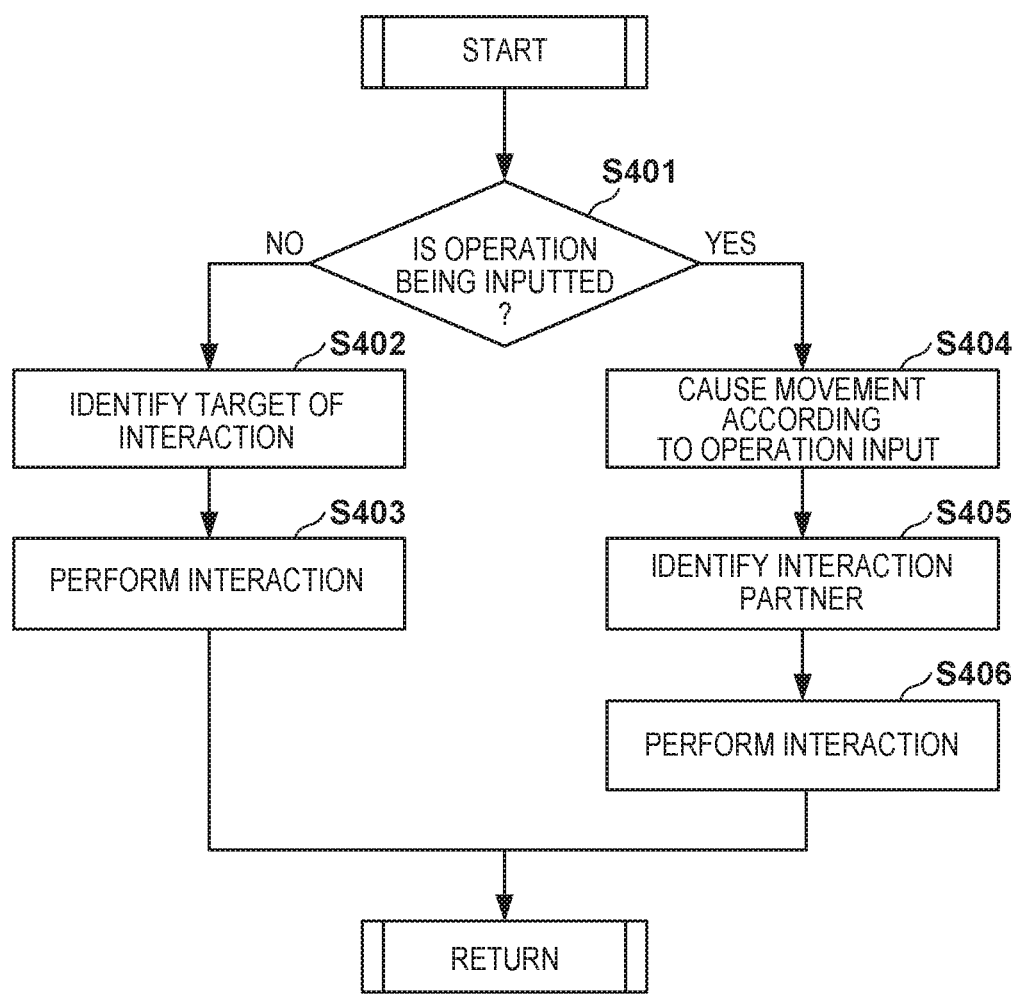
FIG. 4 is a flowchart for describing processing for controlling actions of an operation target game character.

The flowchart of FIG. 4 is used to give an explanation regarding processing for controlling an action of an operation target game character in such a game. Note that, processing in accordance with the flowchart of FIG. 4 is executed as a part of processing of the game (for example, a subroutine).

<Step S401>

The CPU 101 determines whether or not a user is inputting an instruction (a movement instruction) for causing an operation target game character to move on a game field by operating the operation unit 104. For example, it is determined whether or not a key for making an instruction to cause the operation target game character to move in a predetermined direction is being pressed. If the result of this determination is that an instruction to move the operation target game character is being inputted, the processing advances to step S404, and if such an instruction is not being inputted, the processing advances to step S402.

<Step S402>

Figure 2:
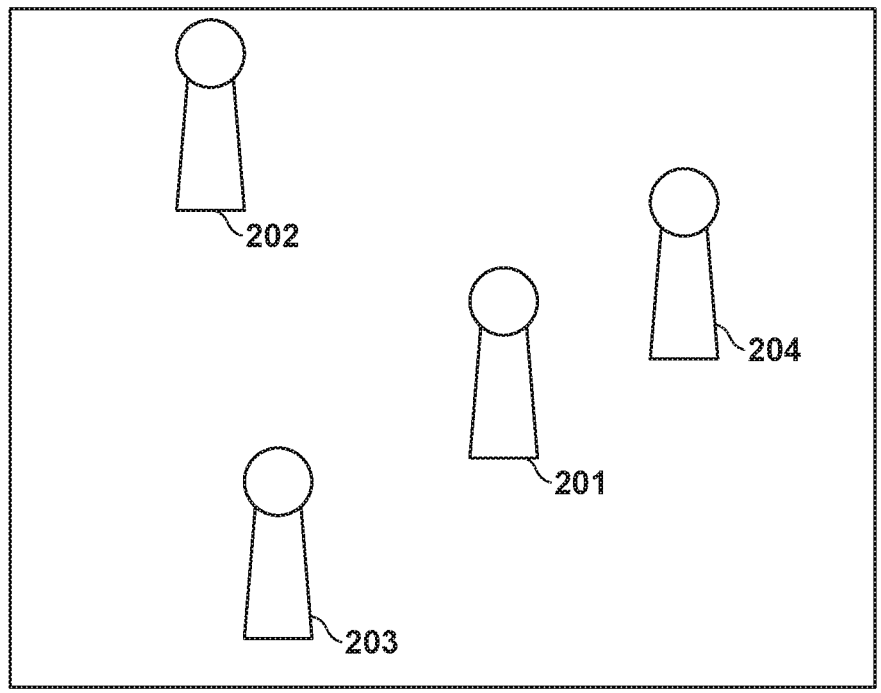
FIG. 2 is a diagram for describing an example of step S402.

The CPU 101 executes an artificial intelligence computer program to specify as an interaction partner one among the one or more non-operation target game characters positioned in the surroundings of the operation target game character. For example, as illustrated in FIG. 2, in a case where non-operation target game characters 202 to 204 are positioned in the surroundings of the operation target game character 201 in the game field, the CPU 101 executes an artificial intelligence computer program to specify as an interaction partner the non-operation target game character 204 which is positioned at the closest position to the operation target game character 201 among the non-operation target game characters 202 to 204. Note that processing for specifying the interaction partner is not limited to this, for example, a non-operation target game character that is closest to the operation target game character and whose life value (life force value) is low compared to the other non-operation target game characters may be made to be the interaction partner.

<Step S403>

Figure 3:
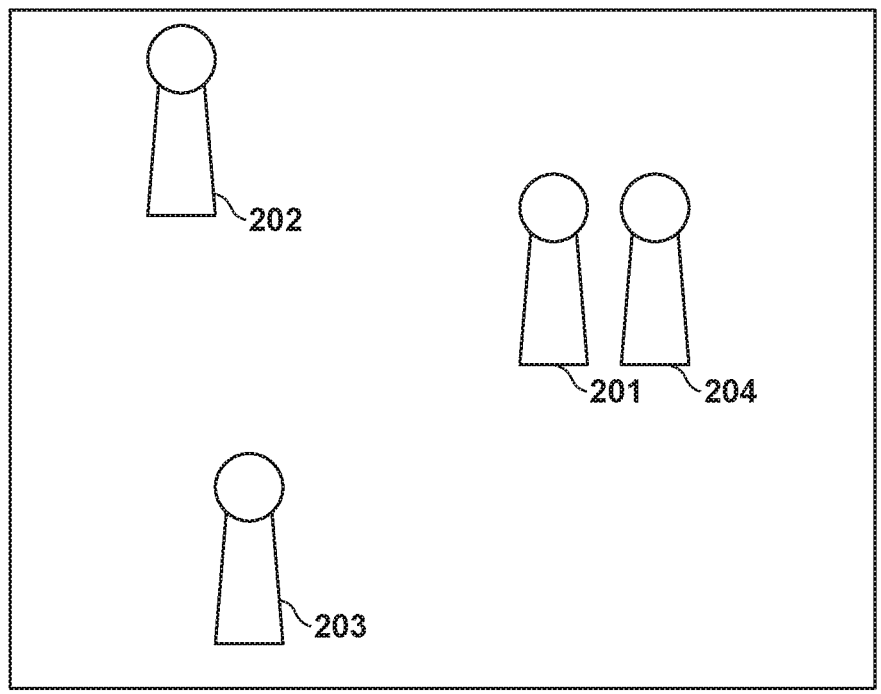
FIG. 3 is a diagram for describing an example of step S403.

The CPU 101 executes an artificial intelligence computer program to cause the operation target game character to interact with the one non-operation target game character specified in step S402. For example, as illustrated in FIG. 3, the operation target game character 201 is caused to move to a position near the non-operation target game character 204 specified in step S402, and is caused to interact with the non-operation target game character 204 there. There are various interactions, and for example a message to the non-operation target game character 204 may be generated, and caused to be displayed on the display screen of the display unit 105 in a display form of a speech bubble or the like. The message may be something that is generated in advance, or may be generated dynamically.

Also, in a case where a message from an interaction partner is displayed on the display screen of the display unit 105, the CPU 101 may execute an artificial intelligence computer program to cause a response message (a response message may be generated in advance, and may be dynamically generated) corresponding to that message to be displayed on the display screen of the display unit 105.

Note that it is not necessary to always perform the processing of step S403, and it may be performed in response to a length of a period over which an instruction to move the operation target game character has not been inputted, for example, becoming a predetermined length (3 seconds, for example).

<Step S404>

The CPU 101 causes the operation target game character to move on the game field in a direction of movement and at a movement speed in accordance with a movement instruction by a user.

<Step S405>

The CPU 101, by executing an artificial intelligence computer program, similarly to the above described step S402, specifies, as an interaction partner, one among the one or more non-operation target game characters positioned in the surroundings of the operation target game character.

<Step S406>

The CPU 101 executes an artificial intelligence computer program to cause the operation target game character to interact with the one non-operation target game character specified in step S405. Here, an interaction which does not change the direction of movement and the movement speed corresponding to the movement instruction by a user is performed. For example, the face of the operation target game character may be directed towards the face of the non-operation target game character specified in step S405, and furthermore, a message to the non-operation target game character may be generated, and the message may be caused to be displayed on the display screen of the display unit 105 in a display form such as a speech bubble. The message may be something that is generated in advance, or may be generated dynamically.

Also, in a case where a message from the interaction partner is displayed on the display screen of the display unit 105, the CPU 101 may execute an artificial intelligence computer program to cause a response message (the response message may be generated in advance, and may be dynamically generated) corresponding to that message to be displayed on the display screen of the display unit 105.

Note that the processing of step S406 need not be always performed, and configuration may also be taken such that it is performed in a case where movement of the operation target game character, for example, has continued for a predetermined time (one second, for example) or more from when the movement started.

In other words, in the present embodiment an example of operation is explained in which, in a state in which operation input for causing a first game character to move is being inputted by a user, the first game character is caused to move in response to the operation input, and the first game character, during the movement, is caused (first control) to perform an action that artificial intelligence decided as an action that the first game character is to perform in relation to a second game character, and in a state in which an operation input is not being inputted by a user, the first game character is caused (second control) to perform an action that artificial intelligence decided as an action that the first game character is to perform in relation to the second game character.

Second Embodiment

In the first embodiment, stand-alone game device operation is assumed. Accordingly, in this case, a non-operation target game character is not operated by a user but is operated by the CPU 101 in the game device. However, even in a so-called network game in which a plurality of game devices are connected, and players of the respective game devices cooperate to advance operations, it is possible to, for each game device, control actions of an operation target game character that a user of the game device operates similarly to in the first embodiment. In this case, a non-operation target game character in a game device of interest may be an operation target game character in a game device other than the game device of interest.

In the case of the present embodiment, for example, when it receives via the I/F 108 a message transmitted from a server managing a network game or a game device of an interaction partner, it determines whether or not operation input is currently being performed on the game device of a player. Then, if operation input is not being performed, a message that a user inputted by operating the operation unit 104 or a message that the game device of the player generated or specified is caused to be displayed on the display screen of the display unit 105, and the message is transmitted to the server and the game device of the interaction partner. Meanwhile, if operation input is being performed, the operation target game character is caused to move on the game field in a direction of movement and at a movement speed in accordance with an instruction to move by the user, and a response message is generated or specified by executing an artificial intelligence computer program, and the response message is caused to be displayed on the display screen of the display unit 105, and is transmitted to the server and a game device of an interaction partner.

Specifically, in the present embodiment, in a state in which a movement instruction is being inputted by a user, in a case where there is an interaction from an operation target game character (second game character) in another game device, the operation target game character of the user (first game character) is caused to move in accordance with the operation input, and the first game character, during the movement, is caused to perform an action that artificial intelligence decided as an action to be performed by the first game character as a response to the interaction. Also, in a case where there is an interaction from a second game character in a state in which a movement instruction is not being inputted by a user, the first game character, during the movement, is caused to perform an action decided depending on operation input from the user or artificial intelligence as an action that the first game character is caused to perform as a response to the interaction.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Also, a game device that comprises: a first control unit configured to, in a state in which operation input for causing a first game character to move is being inputted by a user, cause the first game character to move in response to the operation input, and cause the first game character, during the movement, to perform an action that artificial intelligence decided as an action that the first game character is to perform in relation to a second game character; and a second control unit configured to, in a state in which the operation input is not being inputted by a user, cause the first game character to perform an action that artificial intelligence decided as an action that the first game character is to perform in relation to the second game character, and a method for controlling the game device that comprises:

in a state in which operation input for causing a first game character to move is being inputted by a user, causing the first game character to move in response to the operation input, and causing the first game character, during the movement, to perform an action that artificial intelligence decided as an action that the first game character is to perform in relation to a second game character; and in a state in which the operation input is not being inputted by a user, causing the first game character to perform an action that artificial intelligence decided as an action that the first game character is to perform in relation to the second game character, according to the present invention are realizable by a program executing the methods on one or more computers. The program is providable/distributable by being stored on a computer-readable storage medium or through an electronic communication line.

What is claimed is:

1. A game device, comprising:

a processor; and a memory including a set of instructions that, when executed by the processor, causes the processor to perform operations including:

in a first state in which an operation for causing a first game character to move is being input by a user, (i) causing the first game character to move on a game field in a direction of movement and at a movement speed in accordance with the operation, (ii) deciding, by artificial intelligence, a first action that the first game character can perform without changing the direction of the movement and the movement speed of the first game character while the first game character is caused to move on the game field in the direction of the movement and at the movement speed in accordance with the operation, and (iii) causing the first game character, while the first game character is caused to move on the game field in the direction of the movement and at the movement speed in accordance with the operation, to perform the decided first action of the first game character; and in a second state in which the operation is not being input by the user, causing the first game character to perform a second action in relation to a second game character, the second action being decided by the artificial intelligence.

2. The game device according to claim 1, wherein the processor causes the first game character to perform the second action in response to a length of a period over which the operation has not been input by the user becoming a predetermined length.

3. The game device according to claim 1, wherein the processor, in a third case where there is an interaction from the second game character in the first state in which the operation is being input by the user, causes the first game character to move in accordance with the operation, and causes the first game character, during the movement, to perform the first action as a response to the interaction.

4. The game device according to claim 1, wherein the processor, in a third case where there is an interaction from the second game character in the second state in which the operation is not being input by the user, causes the first game character to perform a third action decided by a second operation from the user or the artificial intelligence as a response to the interaction.

5. The game device according to claim 1, wherein the second game character is positioned in surroundings of the first game character.

6. The game device according to claim 1, wherein the second game character is positioned in surroundings of the first game character and has a life value lower than another game character.

7. The game device according to claim 1, wherein the second game character is a target of a second operation by a second user other than the user.

8. The game device according to claim 1, wherein the second action includes a message, displayed on the display screen, to the second game character.

9. A method for controlling a game device, the method comprising:
- in a first state in which an operation for causing a first game character to move is being input by a user, (i) causing the first game character to move on a game field in a direction of movement and at a movement speed in accordance with the operation, (ii) deciding, by artificial intelligence, a first action that the first game character can perform without changing the direction of the movement and the movement speed of the first game character while the first game character is caused to move on the game field in the direction of the movement and at the movement speed in accordance with the operation, and (iii) causing the first game character, while the first game character is caused to move on the game field in the direction of the movement and at the movement speed in accordance with the operation, to perform the decided first action of the first game character; and
- in a second state in which the operation is not being input by the user, causing the first game character to perform a second action in relation to a second game character, the second action being decided by the artificial intelligence.

10. A non-transitory computer-readable storage medium storing a computer program that, when executed, causes a computer of a game device to perform operations, the operations comprising:
- in a first state in which an operation for causing a first game character to move is being input by a user, (i) causing the first game character to move on a game field in a direction of movement and at a movement speed in accordance with the operation, (ii) deciding, by artificial intelligence, a first action that the first game character can perform without changing the direction of the movement and the movement speed of the first game character while the first game character is caused to move on the game field in the direction of the movement and at the movement speed in accordance with the operation, and (iii) causing the first game character, while the first game character is caused to move on the game field in the direction of the movement and at the movement speed in accordance with the operation, to perform the decided first action of the first game character; and
- in a second state in which the operation is not being input by the user, causing the first game character to perform a second action in relation to a second game character, the second action being decided by the artificial intelligence.

* * * * *